US011778515B2

(12) United States Patent
Sun et al.

(10) Patent No.: US 11,778,515 B2
(45) Date of Patent: Oct. 3, 2023

(54) INTERNET PROTOCOL (IP) COMMUNICATION SERVICE OVER WIRELESS INTEGRATED ACCESS AND BACKHAUL (IAB) LINKS

(71) Applicant: T-Mobile Innovations LLC, Overland Park, KS (US)

(72) Inventors: David Z. Sun, Broadlands, VA (US); Kristian Kai Johns, Ashburn, VA (US); Jay Ronald Chernoff, Pawleys Island, SC (US); Charles Anthony Manganiello, Paola, KS (US); Akm Moazzem Hossain, Frisco, TX (US); Charles D. Todd, Parkville, MO (US); Gopal K. Sood, Plano, TX (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 40 days.

(21) Appl. No.: 17/239,957

(22) Filed: Apr. 26, 2021

(65) Prior Publication Data
US 2022/0345944 A1 Oct. 27, 2022

(51) Int. Cl.
*H04W 28/24* (2009.01)
*H04W 76/12* (2018.01)
(Continued)

(52) U.S. Cl.
CPC ....... *H04W 28/24* (2013.01); *H04W 28/0273* (2013.01); *H04W 76/12* (2018.02); *H04W 88/14* (2013.01)

(58) Field of Classification Search
CPC ............ H04W 28/24; H04W 28/0273; H04W 28/0257; H04W 28/0252; H04W 28/0263;
(Continued)

(56) References Cited

U.S. PATENT DOCUMENTS 7,289,453 B2 10/2007 Riedel et al.
7,310,356 B2 12/2007 Abdo et al.
(Continued)

FOREIGN PATENT DOCUMENTS

CN WO2020164178 * 8/2020

OTHER PUBLICATIONS

QoS Assurance in IAB Network, Chen 978-1-7281-3129-0/20/ 2020 IEEE.*
(Continued)

*Primary Examiner* — Sudesh M Patidar

(57) ABSTRACT

A wireless communication network serves user communication devices using Internet Protocol (IP) and Integrated Access and Backhaul (IAB). An IAB Mobile Termination (MT) and an IAB donor establish a wireless IAB link. The IAB MT and a Centralized Unit (CU) establish IP links over the wireless IAB link. The IP links have different QoS levels. The IAB MT exchanges data streams with the user communication devices. The data streams have different QoS requirements. The IAB MT and the CU correlate the QoS requirements of the data streams with the QoS levels of the IP links. The IAB MT and the CU exchange individual ones of the data streams over individual ones of the IP links based on the QoS correlations. The CU exchanges the data streams with a data communication network based on the QoS requirements.

20 Claims, 12 Drawing Sheets

(51) Int. Cl.
*H04W 28/02* (2009.01)
*H04W 88/14* (2009.01)

(58) Field of Classification Search
CPC ............. H04W 28/0268; H04W 28/12; H04W 28/10; H04W 72/087; H04W 72/08; H04W 76/12; H04W 88/14
See application file for complete search history.

(56) References Cited

U.S. PATENT DOCUMENTS

| | | | |
|---|---|---|---|
| 8,239,468 B2 | 8/2012 | Ikeda et al. | |
| 10,206,232 B2 | 2/2019 | Novlan et al. | |
| 10,257,078 B2 | 4/2019 | Faccin et al. | |
| 10,333,574 B2 | 6/2019 | Baghel et al. | |
| 2010/0309837 A1* | 12/2010 | Yi | H04B 7/155 370/315 |
| 2012/0140666 A1* | 6/2012 | Takahashi | H04W 76/15 370/252 |
| 2017/0265119 A1* | 9/2017 | Fang | H04W 8/26 |
| 2018/0115940 A1 | 4/2018 | Abedini et al. | |
| 2018/0184340 A1* | 6/2018 | Pularikkal | H04W 12/06 |
| 2019/0319873 A1* | 10/2019 | Shelar | H04L 45/22 |
| 2020/0252847 A1 | 8/2020 | Park et al. | |
| 2021/0051512 A1* | 2/2021 | Hampel | H04W 80/06 |
| 2021/0105795 A1 | 4/2021 | Zhu et al. | |
| 2021/0127319 A1* | 4/2021 | Huang | H04W 8/08 |
| 2021/0203615 A1* | 7/2021 | Roy | G06N 20/00 |
| 2021/0243672 A1* | 8/2021 | Deshmukh | H04W 40/248 |
| 2021/0250884 A1* | 8/2021 | Iyer | H04W 56/0045 |
| 2021/0360466 A1* | 11/2021 | Jactat | H04W 28/0263 |
| 2023/0056482 A1* | 2/2023 | Nádas | H04L 47/28 |

OTHER PUBLICATIONS

ZTE; "Discussion on IAB architectures"; 3GPP TSG-RAN WG3 Meeting #99bis; Apr. 2018; 9 pages; R3-181829; 3GPP; Sanya, China.

* cited by examiner

INTERNET PROTOCOL (IP) COMMUNICATION SERVICE OVER WIRELESS INTEGRATED ACCESS AND BACKHAUL (IAB) LINKS

TECHNICAL BACKGROUND

Wireless communication networks provide wireless data services to wireless user devices. Exemplary wireless data services include machine-control, internet-access, media-streaming, and social-networking. Exemplary wireless user devices comprise phones, computers, vehicles, robots, and sensors. The wireless user devices execute user applications to support and use the wireless data services. For example, a smartphone may execute a social-networking application that communicates with a content server over a wireless communication network.

The wireless communication networks have wireless access nodes which exchange wireless signals with the wireless user devices over radio frequency bands. The wireless signals use wireless network protocols like Fifth Generation New Radio (5GNR), Long Term Evolution (LTE), Institute of Electrical and Electronic Engineers (IEEE) 802.11 (WIFI), and Low-Power Wide Area Network (LP-WAN). The wireless access nodes exchange network signaling and user data with network elements that are often clustered together into wireless network cores. The network elements comprise Access and Mobility Management Functions (AMFs), Session Management Functions (SMFs), User Plane Functions (UPFs), and the like. The wireless access nodes are coupled to the wireless network cores over backhaul links.

The wireless access nodes comprise Radio Units (RUs), Distributed Units (DUs), and Centralized Units (CUs). The wireless user devices wirelessly communicate with the RUs which may be mounted on towers. The RUs communicate with nearby DUs over fronthaul links. The DUs communicate with CUs over mid-haul links. The CUs communicate with the wireless network cores over the backhaul links. The mid-haul links that couple the DUs and CUs typically comprise wireline links like glass fibers or metal wires. The mid-haul links may also comprise wireless links like point-to-point microwave channels or Integrated Access and Backhaul (IAB) connections. For IAB, the DUs are equipped with IAB Mobile Terminations (MTs) which are essentially wireless user devices that have been is adapted to serve DUs. The DUs and CUs are equipped with IAB donor components which are essentially baseband units for the IAB MTs.

The wireless communication networks provide Internet Protocol (IP) communication services to the wireless user devices. The wireless network cores establish wireless bearers and network tunnels that have the desired Quality-of-Service (QoS) to support the IP service. The wireless user devices wirelessly exchange IP traffic using IP addresses over the wireless bearers and network tunnels. When a DU is using IAB, the IP traffic for the wireless user devices traverses the wireless IAB link between the IAB MT in one DU and the IAB donor in another DU. The IP traffic for the wireless user devices traverses the mid-haul link between the IAB donor in the other DU and the IAB donor in the CU. Unfortunately, the DUs and CUs inefficiently implement IP QoS over these IAB links. Moreover, the IAB MTs do not effectively serve a variety of user communication devices as the MTs typically serve only the wireless user devices over the RUs, DUs, and CUs.

TECHNICAL OVERVIEW

A wireless communication network serves user communication devices using Internet Protocol (IP) and Integrated Access and Backhaul (IAB). An IAB Mobile Termination (MT) and an IAB donor establish a wireless IAB link. The IAB MT and a Centralized Unit (CU) establish IP links over the wireless IAB link. The IP links have different QoS levels. The IAB MT exchanges data streams with the user communication devices. The data streams have different QoS requirements. The IAB MT and the CU correlate the QoS requirements of the data streams with the QoS levels of the IP links. The IAB MT and the CU exchange individual ones of the data streams over individual ones of the IP links based on the QoS correlations. The CU exchanges the data streams with a data communication network based on the QoS requirements.

DETAILED DESCRIPTION

Figure 1:
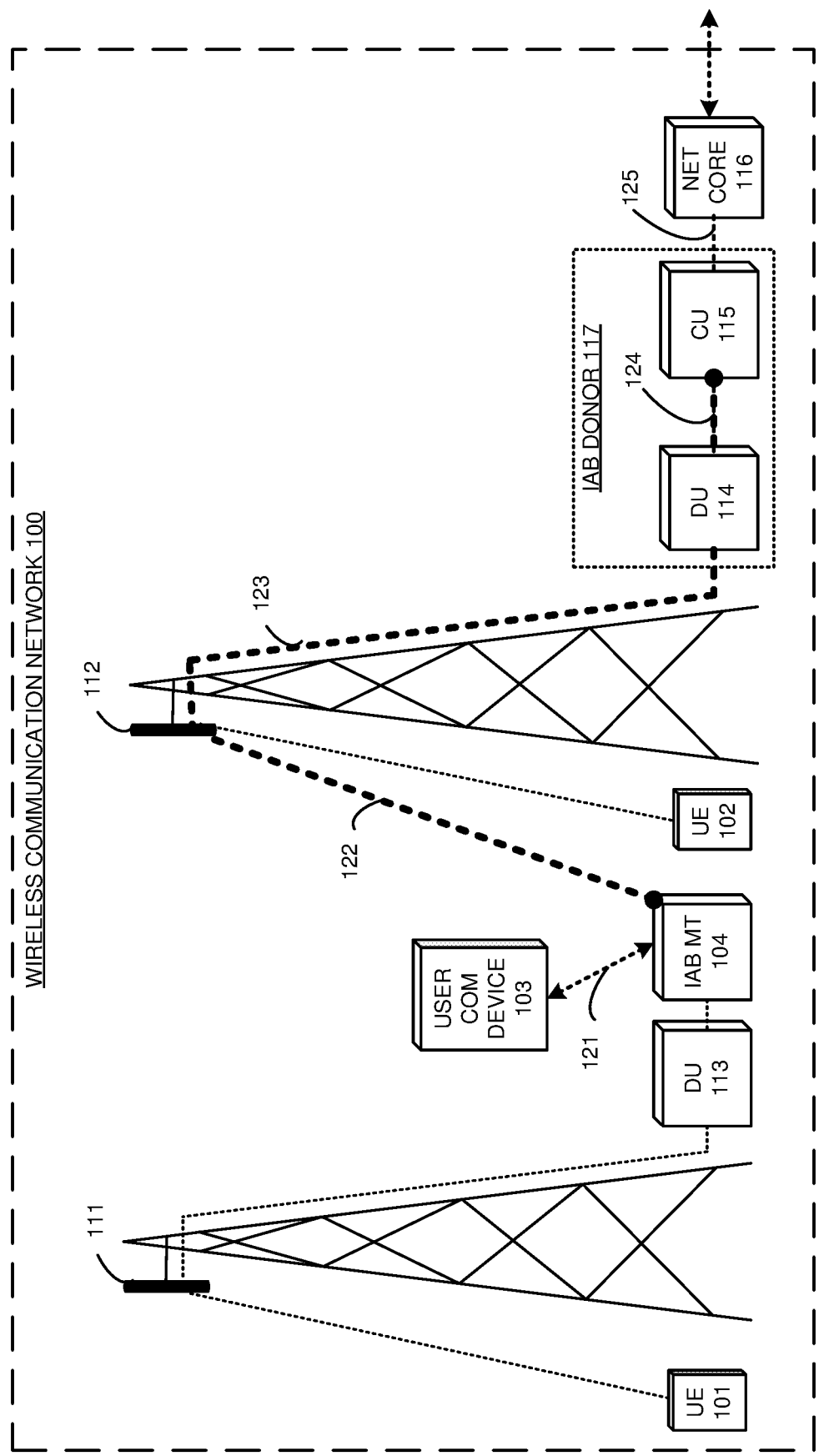
FIG. 1 illustrates a wireless communication network to serve a user communication device with an Internet Protocol (IP) communication service over a wireless Integrated Access and Backhaul (IAB) link.

FIG. 1 illustrates wireless communication network 100 to serve user communication (COM) device 103 with an Internet Protocol (IP) communication service over wireless Integrated Access and Backhaul (IAB) link 122. Wireless communication network 100 comprises User Equipment (UEs) 101-102, user communication device 103, IAB Mobile Termination (MT) 104, Radio Units (RUs) 111-112, Distributed Units (DUs) 113-114, Centralized Unit (CU) 115, and network (NET) core 116. DU 114 and CU 115 comprise IAB donor 117. Wireless communication network 100 delivers services to UEs 101-102 like internet-access, machine-control, media-streaming, or some other data communications product. UEs 101-102 comprise computers, phones, vehicles, sensors, robots, or some other data appliances with wireless communication circuitry. Wireless communication network 100 delivers the IP service to user communication device 103 which might support internet-access, machine-control, media-streaming, or some other IP data product. User communication device 103 comprises a computer, server, access hub, phone, sensor, or some other data appliance with IP communication circuitry. To exchange IP data streams, user communication device 103 uses Institute of Electrical and Electronic Engineers (IEEE) 802.3 (Ethernet), IEEE 802.3 (Wireless Fidelity), and/or some other transport protocol.

Various examples of network operation and configuration are described herein. In some examples, IAB MT 104 and DU 114 establish an IAB link over wireless link 122, RU 112, and fronthaul link 123. IAB MT 104 and CU 115 then establish IP links over the IAB link, DU 114, and mid-haul link 124. The different IP links can have different QoS levels. User communication device 103 and IAB MT 104 exchange a data stream that has a QoS requirement over access link 121. CU 115 and network core 116 exchange the data stream over backhaul link 125. IAB MT 104 and CU 115 correlate the QoS requirement of the data stream with a corresponding QoS level for one of the IP links. For example, a data stream that requires low-latency service would be correlated with an IP link that features a corresponding low-latency data transfer. IAB MT 104 and CU 115 exchange the data stream over the corresponding IP link (which traverses links 122-124, RU 112, and DU 114) based on the QoS correlation. CU 115 exchanges the data stream with network core 116 over backhaul link 125 based on the QoS requirements. CU 115 may interwork the data stream and QoS between the IP link and network tunnel that traverse mid-haul link 124 and another IP link and network tunnel that traverse backhaul link 125. Advantageously, DU 114 and CU 115 efficiently implement IP QoS over the IAB link. Moreover, IAB MT 104 may effectively serve a wide variety of IP communication devices in the manner of user communication device 103.

UEs 101-102 and IAB MT 104 communicate with RUs 111-112 over technologies like Fifth Generation New Radio (5GNR) and Long Term Evolution (LTE). The wireless communication technologies use electromagnetic frequencies in the low-band, mid-band, high-band, or some other portion of the electromagnetic spectrum. Communication links 121-125 use metallic links, glass fibers, radio channels, or some other communication media. Communication links 121-125 use Ethernet, IP, Time Division Multiplex (TDM), Data Over Cable System Interface Specification (DOCSIS), General Packet Radio Service Transfer Protocol (GTP), 5GNR, LTE, WIFI, virtual switching, inter-processor communication, bus interfaces, and/or some other data communication protocols.

UEs 101-102, IAB MT 104, RUs 111-112, and possibly user communication device 103 comprise antennas, amplifiers, filters, modulation, analog/digital interfaces, microprocessors, software, memories, transceivers, bus circuitry, and the like. DUs 113-114, CU 115, network core 116, and possibly user communication device 103 comprise microprocessors, software, memories, transceivers, bus circuitry, and the like. The microprocessors comprise Digital Signal Processors (DSP), Central Processing Units (CPU), Graphical Processing Units (GPU), Application-Specific Integrated Circuits (ASIC), and/or the like. The memories comprise Random Access Memory (RAM), flash circuitry, disk drives, and/or the like. The memories store software like operating systems, user applications, radio applications, and network functions. The microprocessors retrieve the software from the memories and execute the software to drive the operation of wireless communication network 100 as described herein.

Figure 2:
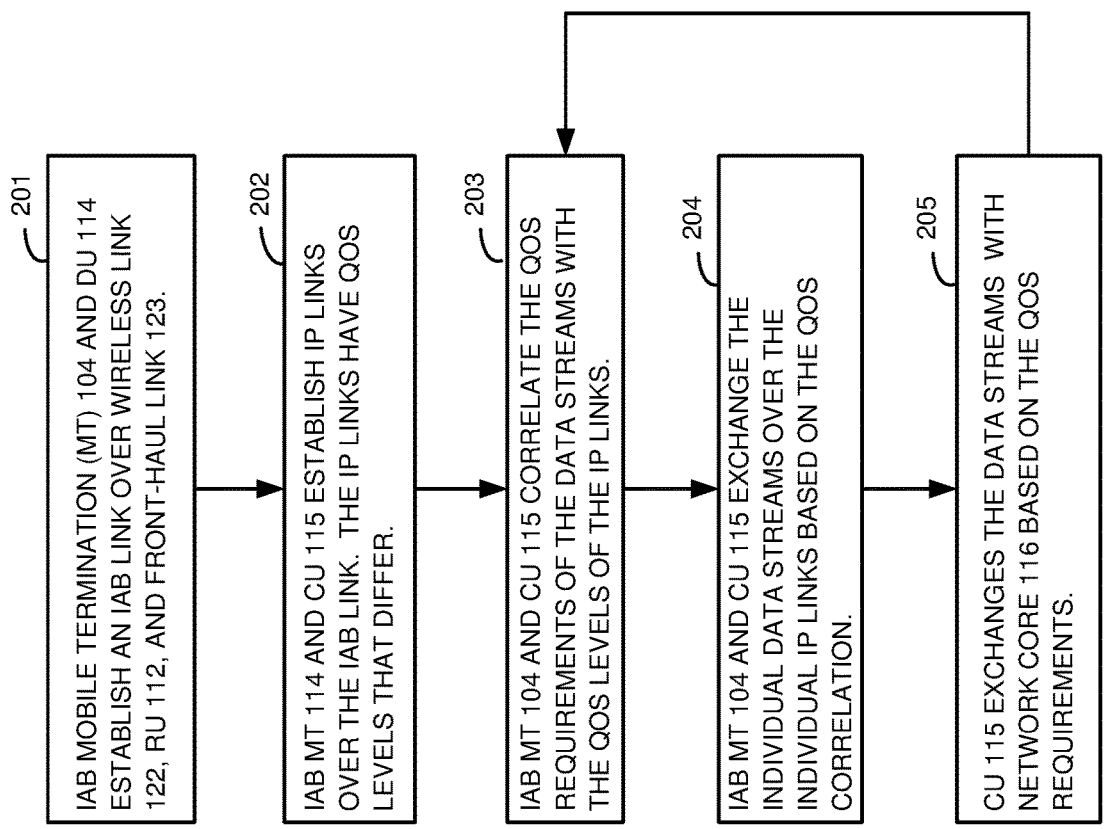
FIG. 2 illustrates an exemplary operation of the wireless communication network to serve the user communication device with the IP communication service over the wireless IAB link.

FIG. 2 illustrates an exemplary operation of wireless communication network 100 to serve user communication device 103 with the IP communication service over IAB. IAB MT 104 and DU 114 establish an IAB link over wireless link 122, RU 112, and front-haul link 123 (201). IAB MT 104 and CU 115 establish IP links over the IAB link, and the IP links can have different QoS levels (202). User communication device 103 and IAB MT 104 exchange a data stream that has a QoS requirement over access link 121 (203). IAB MT 104 and CU 115 correlate the QoS requirement of the data stream with a corresponding QoS level for one of the IP links (203). IAB MT 104 and CU 115 exchange the data stream over the corresponding IP link based on the QoS correlation (204). CU 115 exchanges the data stream with network core 116 based on the QoS requirements (205). The operation repeats (203).

Figure 3:
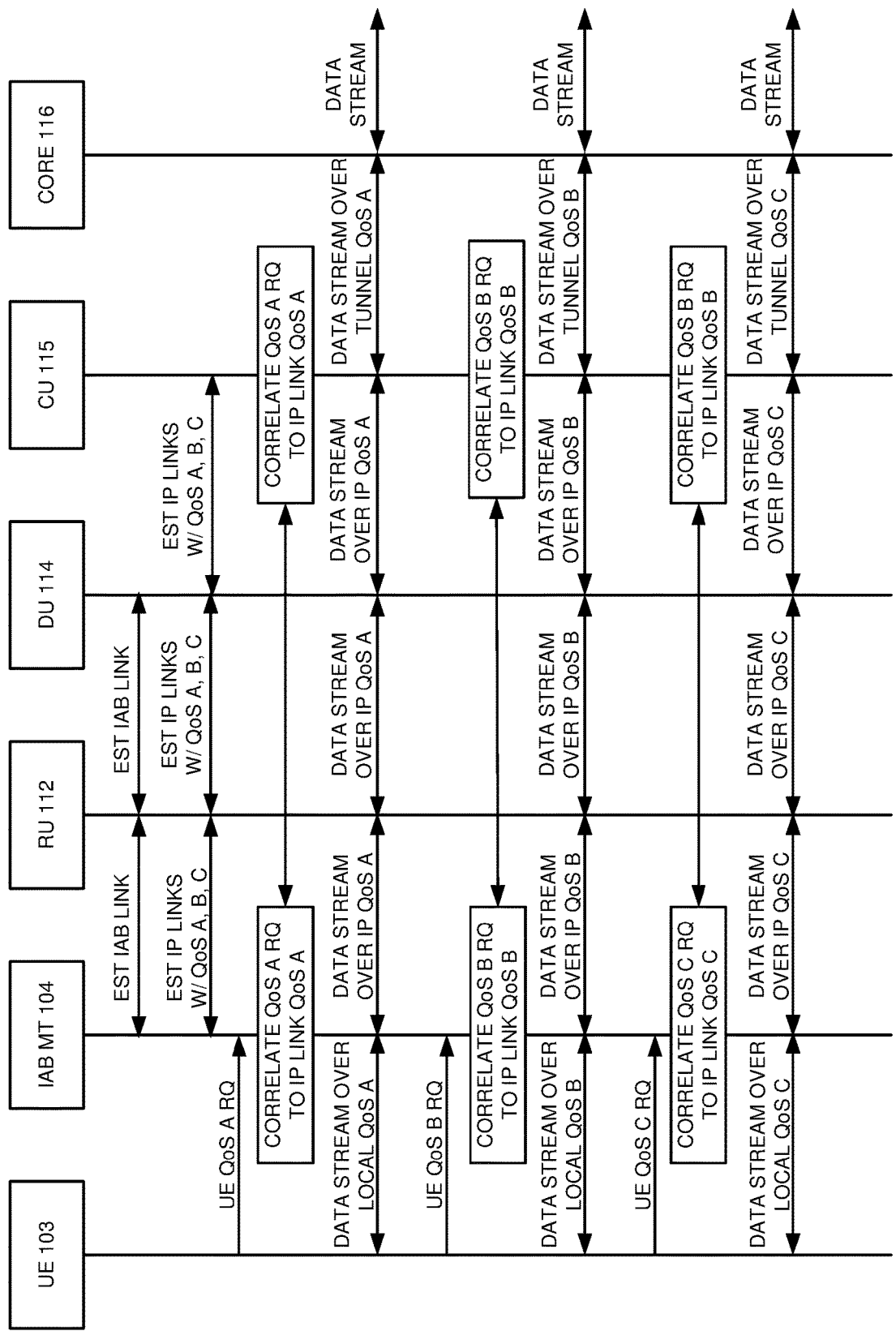
FIG. 3 illustrates an exemplary operation of the wireless communication network to serve the user communication device with the IP communication service over the wireless IAB link.

FIG. 3 illustrates an exemplary operation of the wireless communication network 100 to serve user communication device 103 with the IP communication service over IAB. IAB MT 104 and DU 113 establish an IAB link over wireless link 122, RU 112, and fronthaul link 123. IAB MT 104 and CU 115 establish three IP links over the IAB link, DU 114, and mid-haul link 124. The IP different links have representative and different QoS levels "A", "B", and "C".

User communication device 103 transfers a request for QoS "A" to IAB MT 104. IAB MT 104 and CU 115 correlate the request for QoS "A" to an IP link having QoS "A". The QoS "A" request may comprise physical connectivity to an MT 104 port or MT signaling from device 103. User communication device 103 and IAB MT 104 exchange a data stream that has a local QoS "A" and this exchange may use IP or another protocol. IAB MT 104 may perform Network Address Translation (NAT) between an IP address for device 103 and an IP address for the IP link. IAB MT 104 and CU 115 exchange the data stream using with QoS "A" over an IP link that traverses links 122-124, RU 112, and DU 114. CU 115 and network core 116 exchange the data stream over a network data tunnel in backhaul link 125 that has QoS "A" and this exchange may use IP or another protocol. CU 115 may perform NAT between the IP address for the IP link and an IP address for network core 116. Network core 116 exchanges the data stream with external systems.

User communication device 103 transfers a request for QoS "B" to IAB MT 104. IAB MT 104 and CU 115 correlate the request for QoS "B" to an IP link having QoS "B". The QoS "B" request may comprise physical connectivity to an MT 104 port or MT signaling from device 103. User communication device 103 and IAB MT 104 exchange a data stream that has a local QoS "B" and this exchange may use IP or another protocol. IAB MT 104 may perform NAT between an IP address for device 103 and an IP address for the IP link. IAB MT 104 and CU 115 exchange the data stream using with QoS "B" over an IP link that traverses links 122-124, RU 112, and DU 114. CU 115 and network core 116 exchange the data stream over a network data tunnel in backhaul link 125 that has QoS "B" and this exchange may use IP or another protocol. CU 115 may perform NAT between the IP address for the IP link and an IP address for network core 116. Network core 116 exchanges the data stream with external systems.

User communication device 103 transfers a request for QoS "C" to IAB MT 104. IAB MT 104 and CU 115 correlate the request for QoS "C" to an IP link having QoS "C". The QoS "C" request may comprise physical connectivity to an MT 104 port or MT signaling from device 103. User communication device 103 and IAB MT 104 exchange a data stream that has a local QoS "C" and this exchange may use IP or another protocol. IAB MT 104 may perform NAT between an IP address for device 103 and an IP address for the IP link. IAB MT 104 and CU 115 exchange the data stream using with QoS "C" over an IP link that traverses links 122-124, RU 112, and DU 114. CU 115 and network core 116 exchange the data stream over a network data tunnel in backhaul link 125 that has QoS "C" and this exchange may use IP or another protocol. CU 115 may perform NAT between the IP address for the IP link and an IP address for network core 116. Network core 116 exchanges the data stream with external systems.

Figure 4:
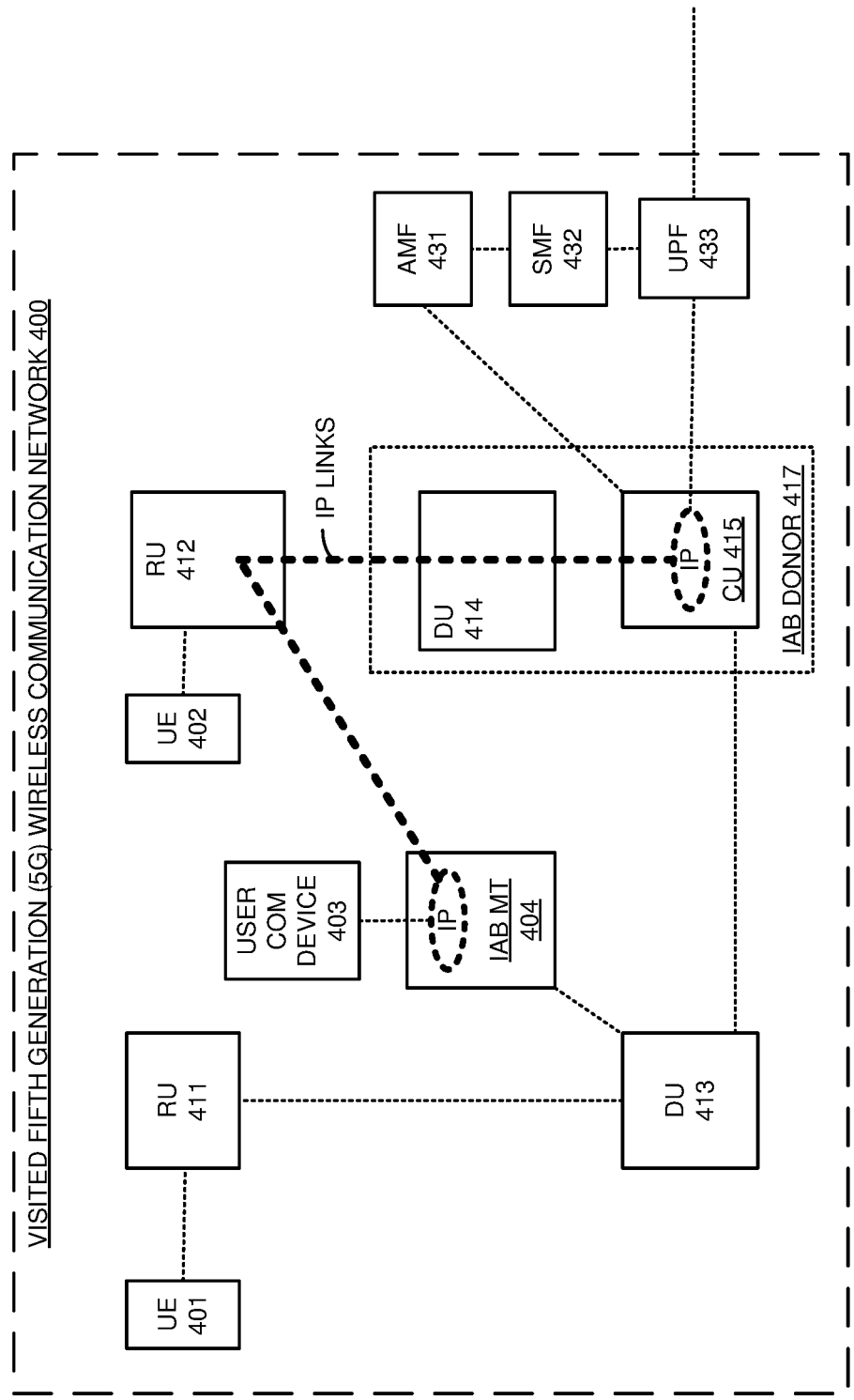
FIG. 4 illustrates a Fifth Generation (5G) communication network to serve a user communication device with an IP communication service over IAB.

FIG. 4 illustrates Fifth Generation (5G) communication network 400 to serve user communication device 403 with an IP communication service over IAB. 5G wireless communication network 400 comprises an example of wireless communication network 100, although network 100 may vary from this example. 5G wireless communication network 400 comprises: UEs 401-402, user communication (COM) device 403, IAB MT 404, RUs 411-412, DUs 413-414, CU 415, Access and Mobility Management Function (AMF) 431, Session Management Function (SMF) 432, and User Plane Function (UPF) 433. DU 414 and CU 415 comprise IAB donor 417.

UE 401 communicates over the data path: RU 411-DU 413-CU 415-UPF 433. Alternatively, UE 401 communicates over the data path: UE 401 communicates over the data path: RU 411-DU 413-IAB MT 404-RU 412-DU 414-CU 415-UPF 433. UE 402 communicates over the data path: RU 412-DU 414-CU 415-UPF 433.

IAB MT 404 and DU 414 establish an IAB link over RU 412. DU 414 and CU 415 establish a General Purpose Radio Service Transfer Protocol (GTP) tunnel with corresponding QoS. IAB MT 404 and CU 415 then establish IP links over the IAB link and GTP tunnel. The IP different links have different QoS levels. CU 415, AMF 431, and SMF 432 establish GTP tunnels between CU 415 and UPF 433 that have corresponding QoS to the IP links.

User communication device 403 and IAB MT 404 exchange IP data. The IP data has different QoS requirements. IAB MT 404 typically NATs the IP data between an IP address for device 403 and an IP address for the IP link having the appropriate QoS. UPF 433 and CU 415 also exchange the IP data. CU 414 typically NATs the IP data between an IP address for UPF 433 and an IP address for the IP link having the appropriate QoS. IAB MT 404 and CU 415 correlate the individual QoS requirements of the IP data with the individual QoS levels of the IP links.

To implement the correlation, CU 415 allocates an IP address pair for a desired QoS and selects a Differentiated Services Control Point (DSCP) mark that corresponds to the QoS. IAB MT 404 and CU 415 address IP packets with the IP address pair and mark the IP packets with the DSCP mark. IAB MT 404 and CU 415 exchange the marked IP packets over RU 412 and DU 414. IAB MT 404, RU 412, DU 414, and CU 415 deliver the requested QoS indicated by the DSCP mark. DU 414 interworks the IP links between Backhaul Adaption Protocol (BAP) for IAB MT 404 and GTP for CU 415. CU 115 exchanges the IP data with UPF 433 over another GTP tunnel that has a corresponding QoS. CU 415 may perform NAT between the GTP tunnels. UPF 433 may exchange the IP data with external systems using a corresponding QoS. UE 403 communicates over the data path: IAB MT 404-RU 412-DU 414-CU 415-UPF 433.

Figure 5:
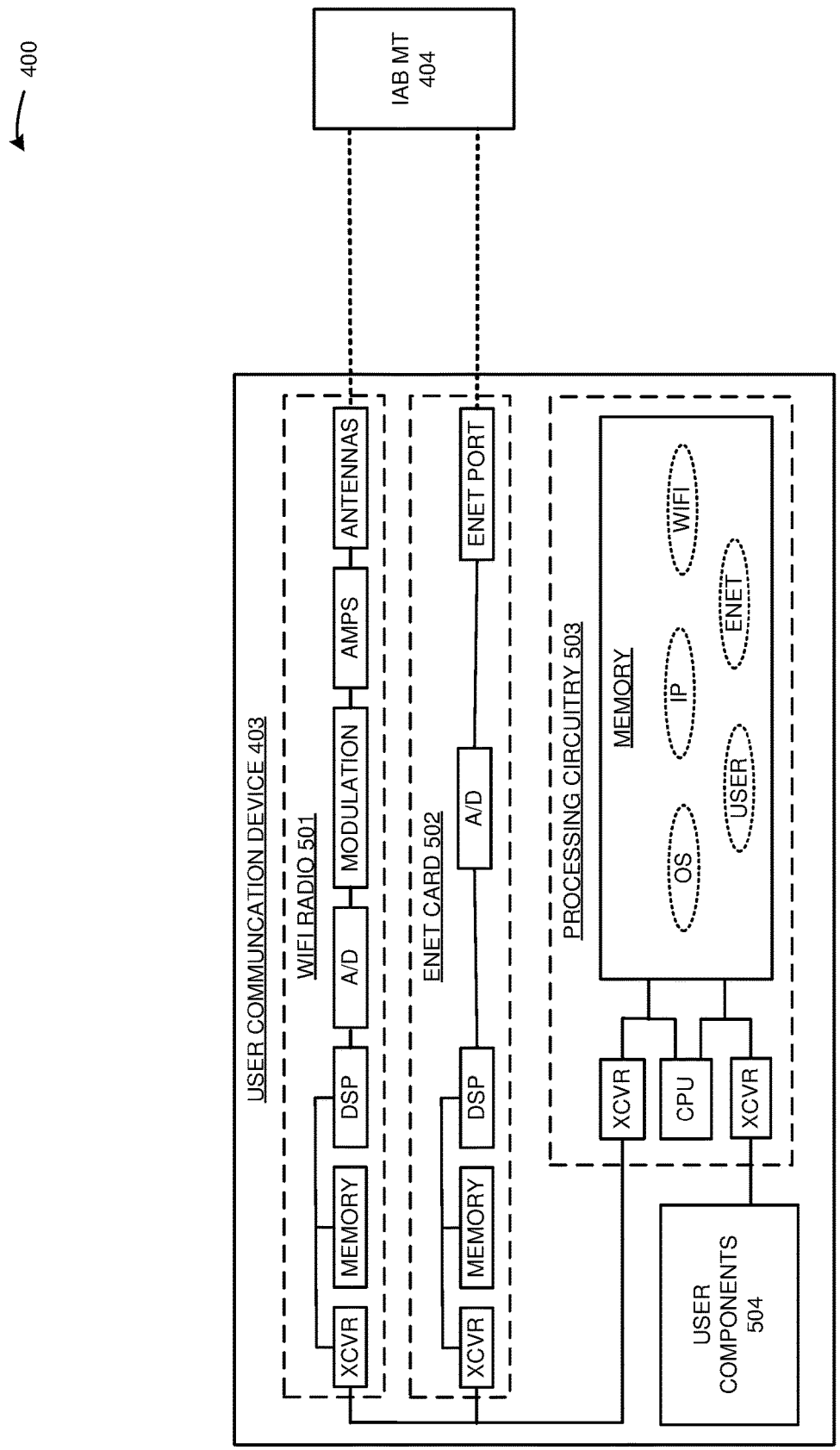
FIG. 5 illustrates the user communication device in the 5G wireless communication network.

FIG. 5 illustrates user communication device 403 in 5G wireless communication network 400. User communication device 403 comprises an example of user communication device 103, although device 103 may differ. User communication device 403 comprises WIFI radio 501, Ethernet (ENET) card 502, processing circuitry 503, and user components 504. In some examples, the WIFI portions are omitted and user communication device 403 uses Ethernet. In other examples, the Ethernet portions are omitted and user communication device 403 uses WIFI. Other data communication protocols could be used as an alternative or addition.

WIFI radio 501 comprises antennas, amplifiers, filters, modulation, analog-to-digital interfaces, DSP, memory, and transceivers that are coupled over bus circuitry. Ethernet card 502 comprises an ethernet port, analog-to-digital interfaces, DSP, memory, and transceivers that are coupled over bus circuitry. Processing circuitry 503 comprises memory, CPU, user interfaces and components, and transceivers that are coupled over bus circuitry. The memory in processing circuitry 503 stores an operating system, user applications (USER), and network applications for IP, WIFI, and Ethernet. The antennas in WIFI radio 501 are wirelessly coupled to IAB MT 404 over a WIFI link that transports IP. The port(s) in Ethernet card 502 are wireline coupled to IAB MT 404 over an Ethernet link that transports IP. Transceivers (XCVRs) in radio 501 and card 502 are coupled to transceivers in processing circuitry 503. Transceivers in processing circuitry 503 are coupled to user components 504 like displays, controllers, and memory. The CPU in processing circuitry 503 executes the operating system, user applications, and network applications to exchange IP data with IAB MT 404 over radio 501 and card 502.

Figure 6:
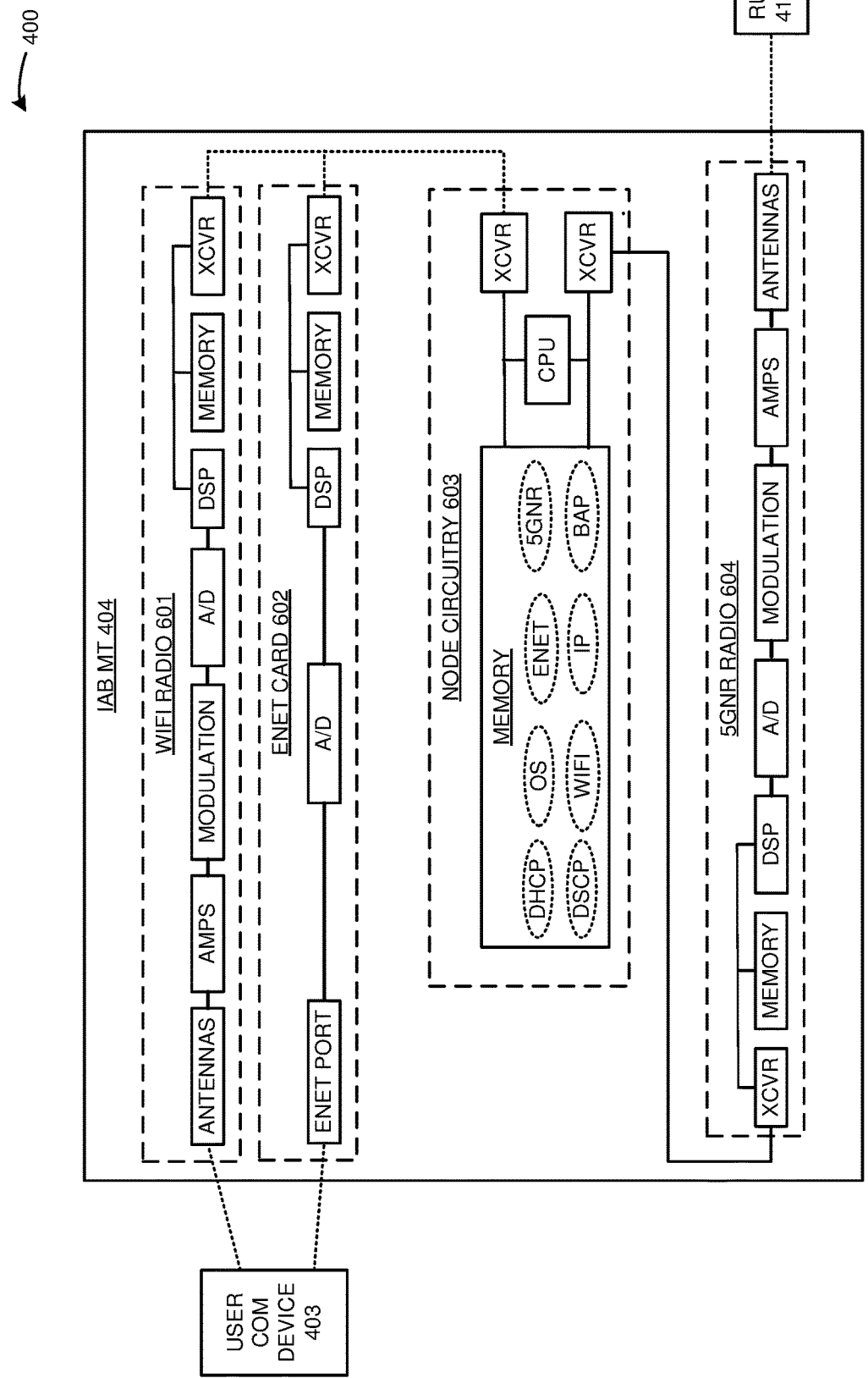
FIG. 6 illustrates an IAB Mobile Termination (MT) in the 5G wireless communication network.

FIG. 6 illustrates IAB Mobile Termination (MT) 404 in 5G wireless communication network 400. IAB MT 404 comprises an example of IAB MT 104, although MT 104 may differ. IAB MT 404 comprises WIFI radio 601, Ethernet card 602, node circuitry 603, and 5GNR radio 604. In some examples, the WIFI portions are omitted and IAB MT 404 uses Ethernet and 5GNR. In other examples, the Ethernet portions are omitted and IAB MT 404 uses WIFI and 5GNR. Other data communication protocols could be used as an alternative or addition.

WIFI radio 601 comprises antennas, amplifiers, filters, modulation, analog-to-digital interfaces, DSP, memory, and transceivers that are coupled over bus circuitry. Ethernet card 602 comprises an ethernet port, analog-to-digital interfaces, DSP, memory, and transceivers that are coupled over bus circuitry. Node circuitry 603 comprises memory, CPU, user interfaces and components, and transceivers that are coupled over bus circuitry. The memory in processing circuitry 603 stores an operating system and network applications for IP, WIFI, Ethernet, 5GNR Backhaul Adaption Protocol (BAP), Dynamic Host Configuration Protocol (DHCP), and DSCP. 5GNR radio 604 comprises antennas, amplifiers, filters, modulation, analog-to-digital interfaces, DSP, memory, and transceivers that are coupled over bus circuitry.

The antennas in WIFI radio 601 are wirelessly coupled to user communication device 403 over a WIFI link that transports IP. The port in Ethernet card 602 is wireline coupled to user communication device 403 over an Ethernet link that transports IP. Transceivers in radio 601 and card 602 are coupled to transceivers in node circuitry 603.

Transceivers in node circuitry 603 are coupled to transceivers 5GNR radio 604. The antennas in 5GNR radio 601 are wirelessly coupled to RU 412 over a 5GNR link that transports IP over IAB. The CPU in node circuitry 603 executes the operating system and network applications to exchange IP data between user communication device 403 and RU 412.

Figure 7:
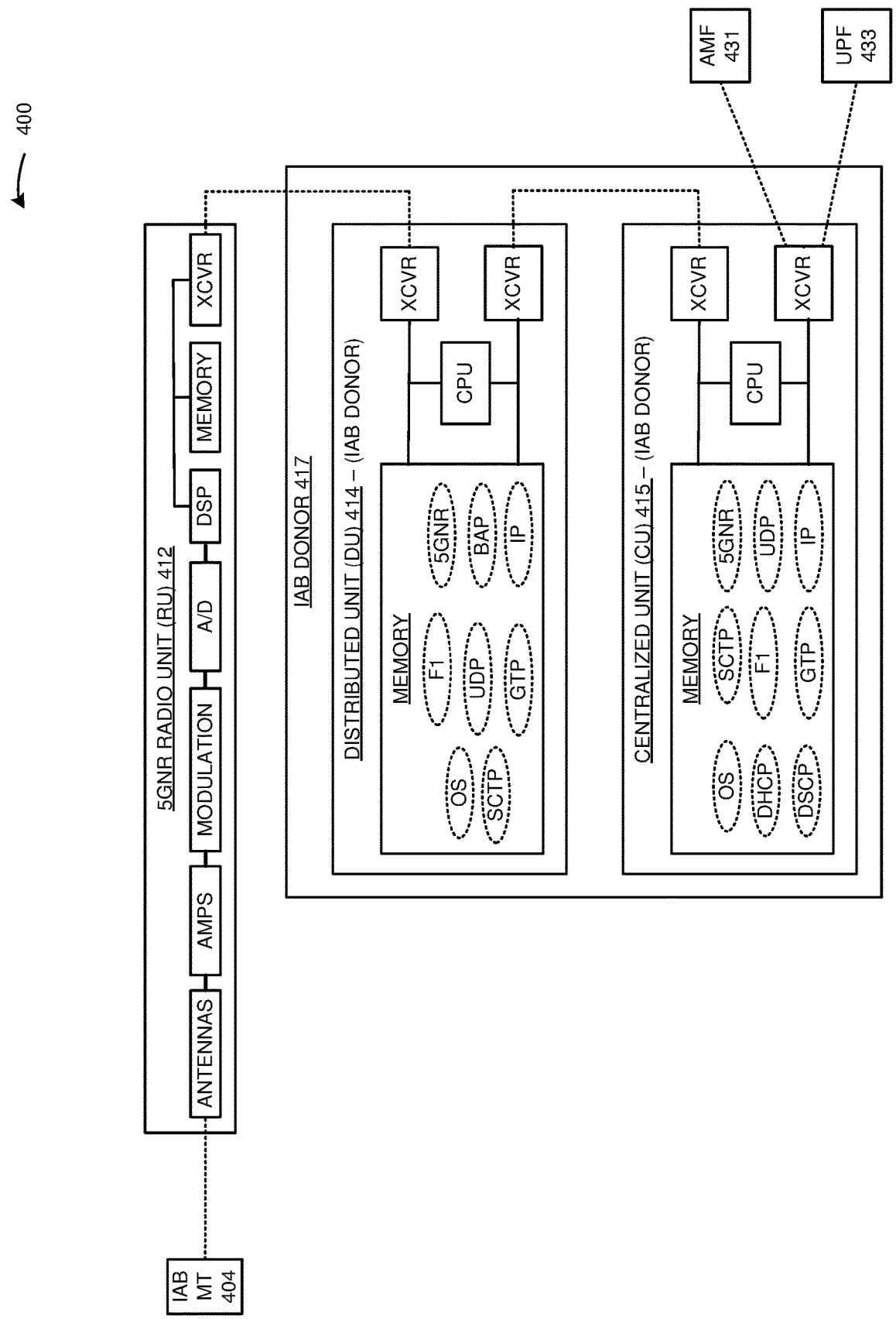
FIG. 7 illustrates an IAB donor in the 5G wireless communication network.

FIG. 7 illustrates IAB donor 417 in 5G wireless communication network 400. IAB donor 417 comprises an example of IAB donor 117, although donor 417 may differ. IAB donor 417 comprises DU 414 and CU 415. IAM MT 404 and DU 414 communicate over RU 412. RU 412 comprises antennas, amplifiers, filters, modulation, analog-to-digital interfaces, DSP, memory, and transceivers that are coupled over bus circuitry. DU 414 and CU 415 comprise memory, CPU, and transceivers that are coupled over bus circuitry. The memory in DU 414 and CU 415 store operating systems (OS) and network applications. The network applications in DU 414 include Stream Control Transmission Protocol (SCTP), DU/CU F1, 5GNR, User Data Protocol (UDP), BAP, GTP, and IP. The network applications in CU 415 include like SCTP, DU/CU F1, 5GNR, DHCP, UDP, DSCP, GTP, and IP. The 5GNR DU network applications include Physical Layer (PHY), Media Access Control (MAC), Radio Link Control (RLC). The 5GNR CU network applications include Packet Data Convergence Protocol (PDCP), Service Data Adaption Protocol (SDAP), and Radio Resource Control (RRC).

The antennas in RU 412 are wirelessly coupled to IAB MT 404 over 5GNR links. Transceivers in RU 412 are coupled to transceivers in DU 414 over fronthaul links like enhanced Common Public Radio Interface (eCPRI). Transceivers in DU 414 coupled to transceivers in CU 415 over mid-haul links. Transceivers in CU 415 are coupled to AMF 431 and UPF 432 over backhaul links. The CPU in DU 414 executes its operating system and network applications to exchange 5GNR data units with RU 412 and to exchange 5GNR data units with CU 415. The CPU in CU 415 executes its operating system and network applications to exchange the 5GNR data units with DU 414, exchange N2/N1 signaling with AMF 431 and exchange N3 data with UPF 433.

Figure 8:
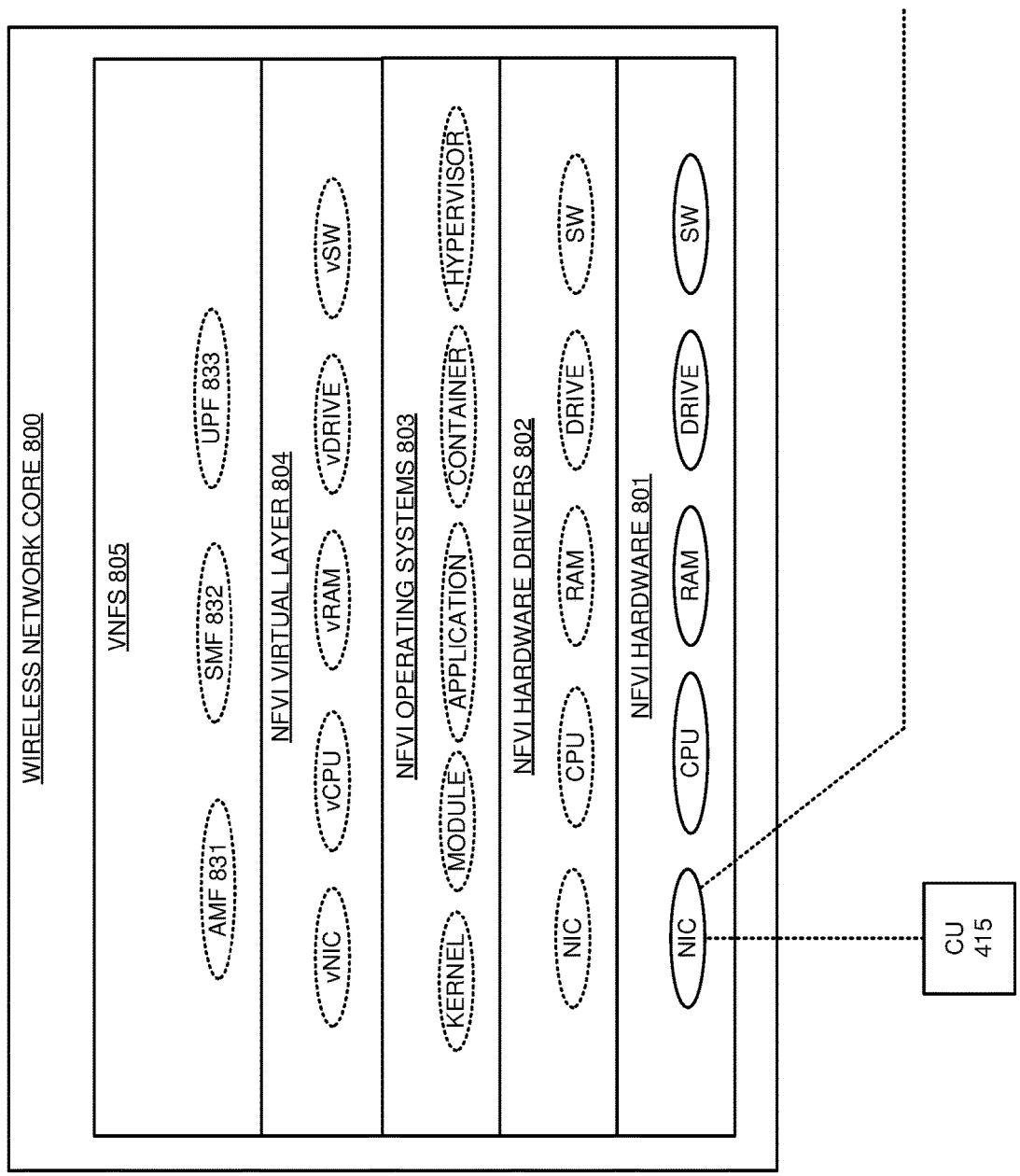
FIG. 8 illustrates a wireless network core in the 5G wireless communication network.

FIG. 8 illustrates wireless network core 800 in 5G wireless communication network 400. Wireless network core 800 comprises an example of network core 116, although core 116 may differ. Wireless network core 800 comprises Network Function Virtualization Infrastructure (NFVI) hardware 801, NFVI hardware drivers 802, NFVI operating systems 803, NFVI virtual layer 804, and NFVI Virtual Network Functions (VNFs) 805. NFVI hardware 801 comprises Network Interface Cards (NICs), CPU, RAM, Flash/Disk Drives (DRIVE), and Data Switches (SW). NFVI hardware drivers 802 comprise software that is resident in the NIC, CPU, RAM, DRIVE, and SW. NFVI operating systems 803 comprise kernels, modules, applications, containers, hypervisors, and the like. NFVI virtual layer 804 comprises vNIC, vCPU, vRAM, vDRIVE, and vSW. NFVI VNFs 805 comprise Access and Mobility Management Function (AMF) 831, Session Management Function (SMF) 832, and User Plane Function (UPF) 833. Other VNFs like Authentication Server Function (AUSF) and Network Repository Function (NRF) are typically present but are omitted for clarity. Wireless network core 800 may be located at a single site or be distributed across multiple geographic locations. The NIC in NFVI hardware 801 are coupled to CU 415 over backhaul links. The NIC in NFVI hardware 801 are coupled to external data systems over inter-network links. NFVI hardware 801 executes NFVI hardware drivers 802, NFVI operating systems 803, NFVI virtual layer 804, and NFVI VNFs 805 to form and operate AMF 431, SMF 432, and UPF 433.

Figure 9:
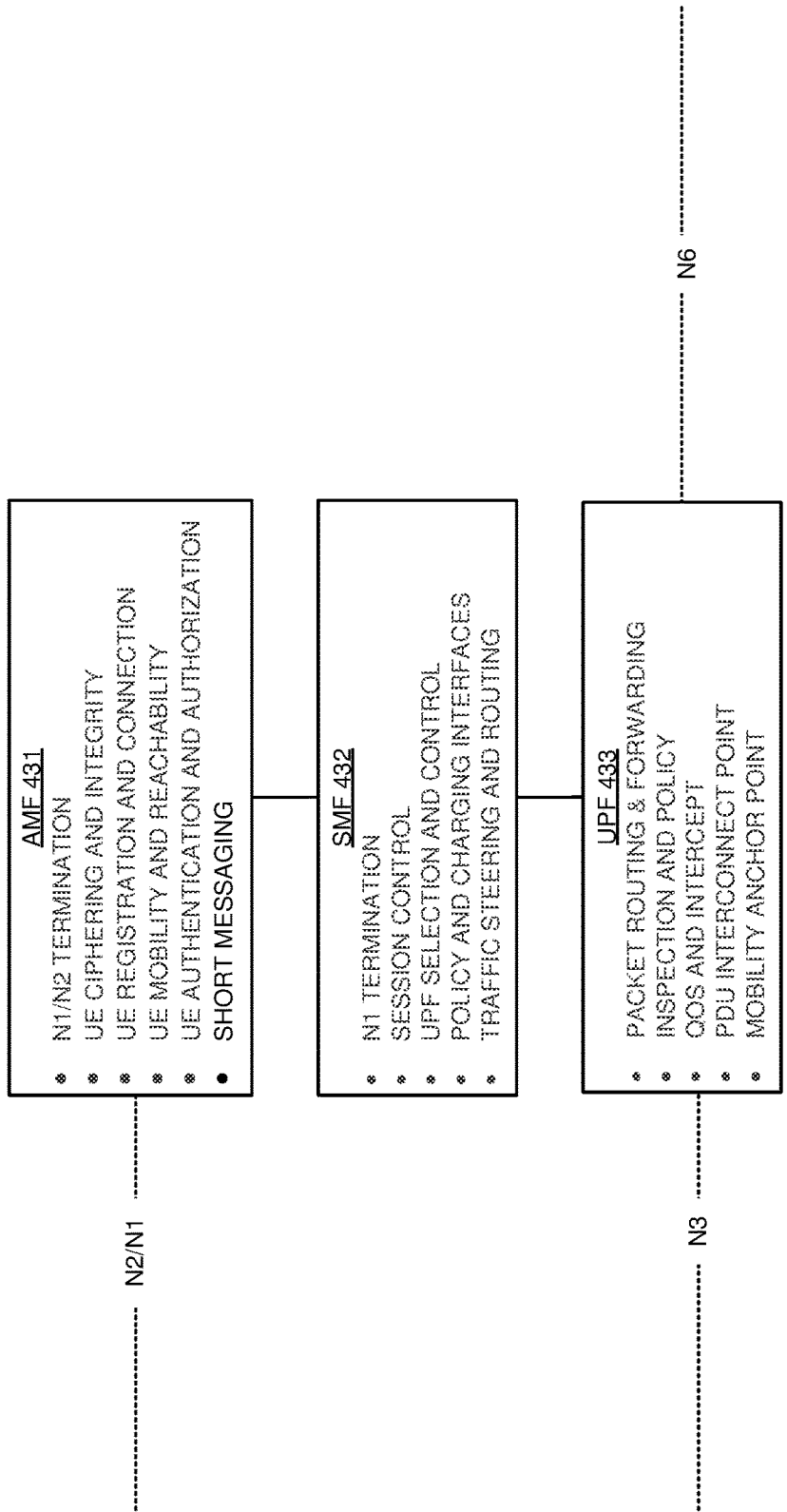
FIG. 9 further illustrates the wireless network core in the 5G wireless communication network.

FIG. 9 further illustrates wireless network core 800 in 5G wireless communication network 400. AMF 431 performs N1, termination, N2 termination, UE ciphering & integrity protection, UE registration and connection, UE mobility and reachability, UE authentication and authorization, and short messaging. SMF 432 performs N1 termination, session establishment/management, UPF selection and control, policy and charging control, and traffic steering and routing, UPF 433 performs packet routing & forwarding, packet, inspection and policy, QoS handling and lawful intercept, MU interconnection, and mobility anchoring.

Figure 10:
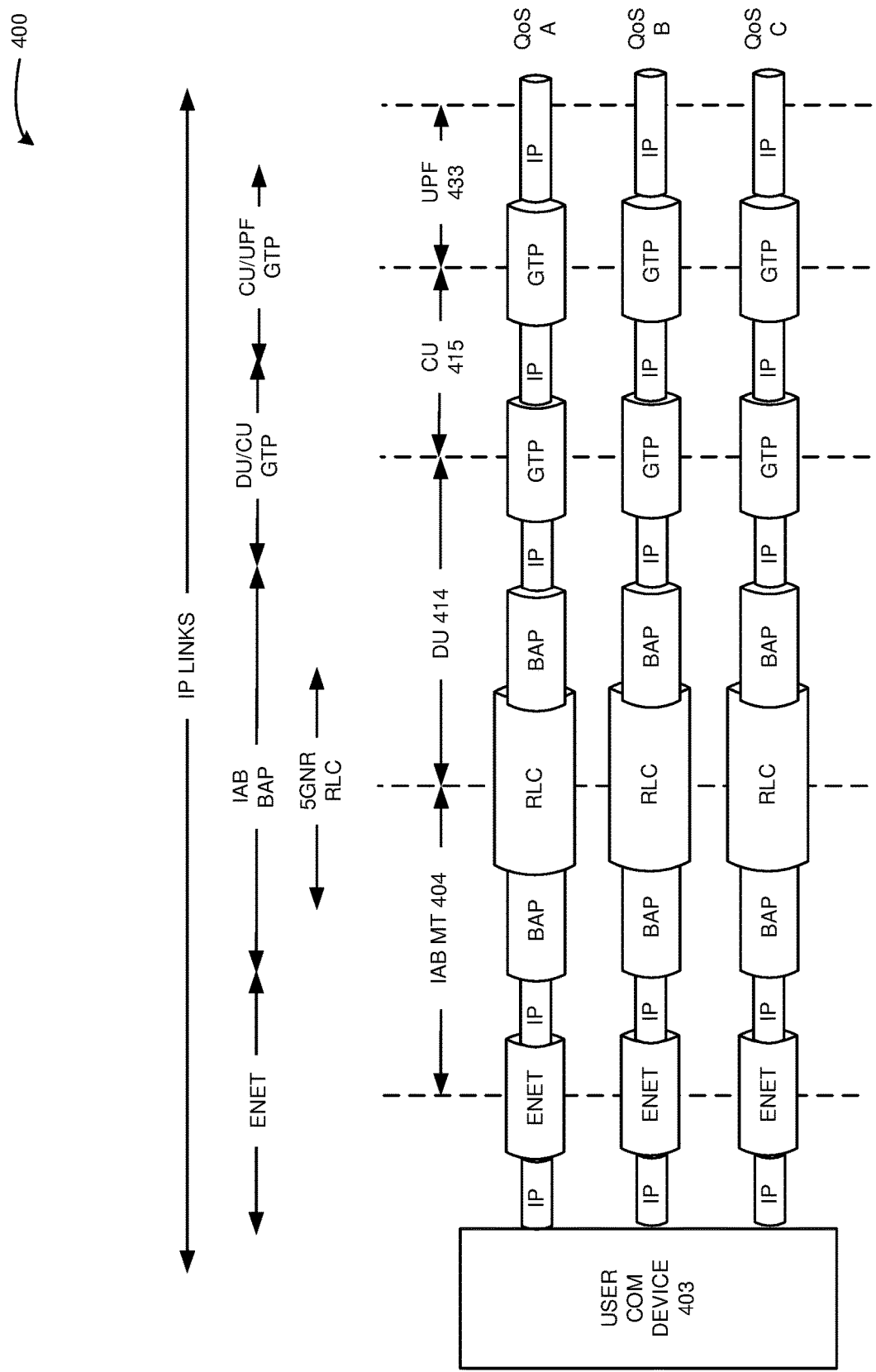
FIG. 10 illustrates an exemplary operation of the 5G wireless communication network to serve the user communication device with the IP communication service over IAB.

FIG. 10 illustrates an exemplary operation of 5G wireless communication network 400 to serve user communication device 403 with the IP communication service over IAB. User communication device 403 exchanges data streams over IP links that have differing QoS. The IP links traverse IAB MT 404, DU 414, CU 415, and UPF 433. User communication device 403 and IAB MT 404 exchange the data streams over Ethernet and IP using the respective QoS for each data stream. IAB MT may perform NAT. IAB MT 404 and DU 414 exchange the data streams over RLC and BAP and IP using the respective QoS for each data stream. DU 414 and CU 415 exchange the data streams over GTP and IP using the respective QoS for each data stream. CU 415 and UPF 433 exchange the data streams over GTP and IP using the respective QoS for each data stream. CU 415 may perform NAT. UPF 433 exchanges the data streams with external systems using the respective QoS for each data stream.

Figure 11:
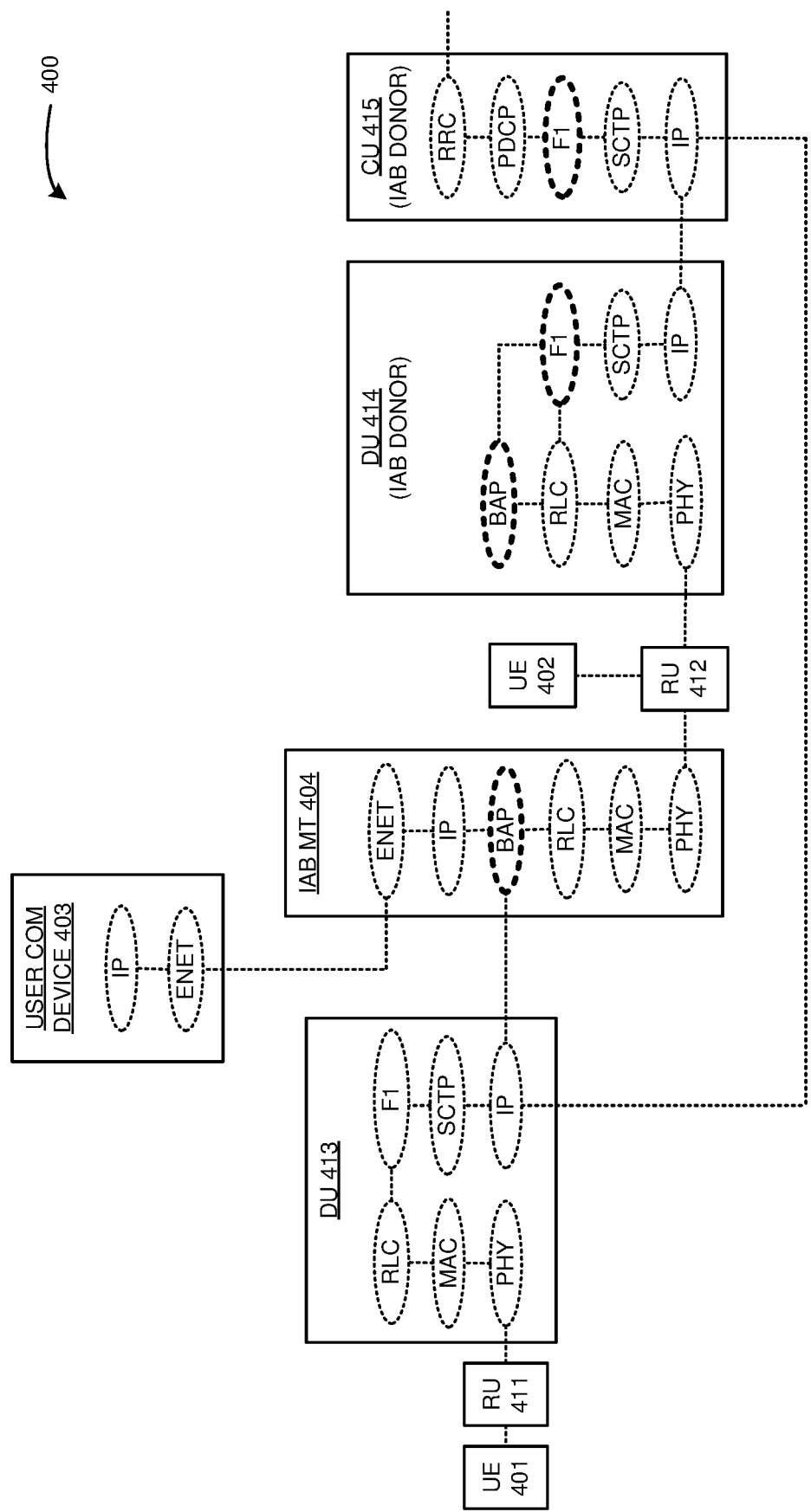
FIG. 11 illustrates an exemplary control-plane operation of the 5G wireless communication network to serve the user communication device with the IP communication service over IAB.

FIG. 11 illustrates an exemplary control-plane operation of 5G wireless communication network 400 to serve user communication device 403 with the IP communication service over IAB. UE 401 exchanges network signaling with the RRC in CU 415 over the signaling path: UE 401-RU 411-DU 413 (PHY/MAC/RLC/F1/SCTP/IP)-CU 415 (IP/SCTP/F1/PDCP). If needed, UE 401 exchanges network signaling with the RRC in CU 415 over the signaling path: UE 401-RU 411-DU 413 (PHY/MAC/RLC/F1/SCTP/IP)-IAB MT 404 (BAP/RLC/MAC/PHY)-RU 412-DU 414 (PHY/MAC/RLC/BAP/F1/SCTP/IP)-CU 415 (IP/SCTP/F1/PDCP). UE 402 exchanges network signaling with the RRC in CU 415 over the signaling path: RU 412-DU 414 (PHY/MAC/RLC/F1/SCTP/IP)-CU 415 (IP/SCTP/F1/PDCP). The RRC in CU 415 exchanges N2/N1 signaling with AMF 431 in network core 800 to deliver wireless communication services to UEs 401-402.

To serve user communication device 403 over a particular IP QoS, the BAP in IAB MT 404 and the F1 in CU 415 exchange network signaling over the signaling path: IAB MT 404 (RLC/MAC/PHY)-RU 412-DU 414 (PHY/MAC/RLC/BAP/F1/SCTP/IP)-CU 415 (IP/SCTP). IAB MT 404 transfers an IP QoS request in a modified RRC IAB Other Information Message to the F1 in CU 415. The F1 in CU 415 uses DHCP to allocate IP addresses for the BAP in IAB MT 404 and for the GTP user-plane in CU 415 (See CU 415 on FIG. 12). The F1 in CU 415 selects a DSPC mark to deliver the requested QoS over the IP address pair. The F1 in CU 415 directs the RLCs in DU 414 and IAB 414 to establish an RLC tunnel to deliver the requested QoS. The F1 in CU 415 directs the BAPs in DU 414 and IAB 414 to establish a BAP tunnel to deliver the requested QoS over the RLC tunnel. The F1 in CU 415 directs the BAP in IAB MT 404 to serve user communication device 403 using the IP addresses and the DSCP mark over the BAP tunnel that traverses the RLC tunnel.

The F1 in CU 415 and the F1 in DU 414 establish a GTP tunnel that supports the requested QoS to serve user communication device 403 using the IP addresses and the DSCP mark. The F1s in DU 414 and CU 415 directs their respective GTPs (See FIG. 12) to serve user communication device 403 using the IP addresses and the DSCP mark over the GTP tunnel that supports the QoS. The BAP in IAB MT 404 directs the IP user-plane in user communication device 403 to use the IP addresses (or subnet addresses) and the DSPC mark. IAB MT 404 may NAT the IP addresses. CU 415 establishes a GTP tunnel between the SDAP in CU 415 and UPF 433 that supports the requested QoS. In a similar manner, 5G communication network 400 could establish more IP links that have different QoS to serve user communication device 403 and other devices.

Figure 12:
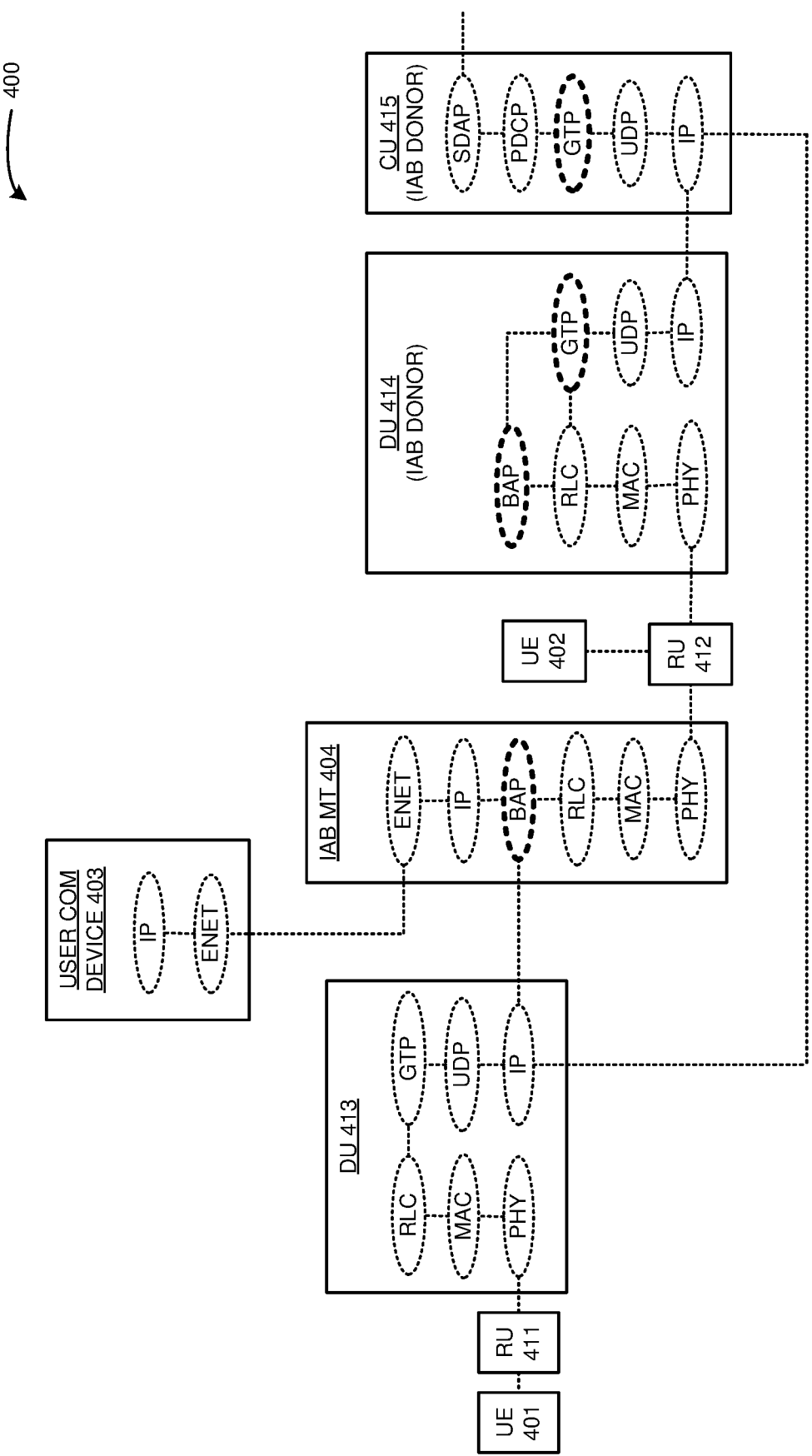
FIG. 12 illustrates an exemplary user-plane operation of the 5G wireless communication network to serve the user communication device with the IP communication service over IAB.

FIG. 12 illustrates an exemplary user-plane operation of the 5G wireless communication network 400 to serve user communication device 403 with the IP communication service over IAB. UE 401 exchanges user data with the SDAP in CU 415 over the data path: UE 401-RU 411-DU 413 (PHY/MAC/RLC/GTP/UDP/IP)-CU 415 (IP/UDP/GTP/PDCP). If needed, UE 401 exchanges user data with the SDAP in CU 415 over the data path: UE 401-RU 411-DU 413 (PHY/MAC/RLC/GTP/UDP/IP)-IAB MT 404 (BAP/RLC/MAC/PHY)-RU 412-DU 414 (PHY/MAC/RLC/BAP/GTP/UDP/IP)-CU 415 (IP/UDP/GTP/PDCP). UE 402 exchanges user data with the SDAP in CU 415 over the data path: UE 402-RU 412-DU 414 (PHY/MAC/RLC/GTP/UDP/IP)-CU 415 (IP/UDP/GTP/PDCP). The SDAP in CU 415 exchanges N3 data with UPF 433 to deliver the wireless communication services to UEs 401-402.

User communication device 403 and the SDAP in CU 415 exchange IP data over the data path: device 403 (IP/ENET)-IAB MT 404 (ENET/IP/BAP/RLC/MAC/PHY)-RU 412-DU 414 (PHY/MAC/RLC/BAP/GTP/UDP/IP)-CU 415 (IP/UDP/GTP/PDCP). The BAP in DU 414 interworks between RLC/BAP/IP data for DU 414 and GTP/IP data for CU 415. User communication device 403 and the GTP user-plane in CU 415 address IP packets with the IP addresses and mark the IP packets with the DSCP mark. IAB MT 404, RU 412, DU 414, and CU 415 deliver the QoS indicated by the DSCP mark. The SDAP in CU 415 exchanges the IP data with UPF 433 over the other GTP tunnel that has the requested QoS. The GTP user-plane in CU 415 may perform NAT between the GTP tunnel for DU 414 and the GTP tunnel for UPF 433. In a similar manner, 5G communication network 400 could serve user communication device 403 and other devices with more IP links that have different QoS.

The wireless data network circuitry described above comprises computer hardware and software that form special-purpose network circuitry to serve user communication devices with IP communication services over wireless IAB links. The computer hardware comprises processing circuitry like CPUs, DSPs, GPUs, transceivers, bus circuitry, and memory. To form these computer hardware structures, semiconductors like silicon or germanium are positively and negatively doped to form transistors. The doping comprises ions like boron or phosphorus that are embedded within the semiconductor material. The transistors and other electronic structures like capacitors and resistors are arranged and metallically connected within the semiconductor to form devices like logic circuitry and storage registers. The logic circuitry and storage registers are arranged to form larger structures like control units, logic units, and Random-Access Memory (RAM). In turn, the control units, logic units, and RAM are metallically connected to form CPUs, DSPs, GPUs, transceivers, bus circuitry, and memory.

In the computer hardware, the control units drive data between the RAM and the logic units, and the logic units operate on the data. The control units also drive interactions with external memory like flash drives, disk drives, and the like. The computer hardware executes machine-level software to control and move data by driving machine-level inputs like voltages and currents to the control units, logic units, and RAM. The machine-level software is typically compiled from higher-level software programs. The higher-level software programs comprise operating systems, utilities, user applications, and the like. Both the higher-level software programs and their compiled machine-level software are stored in memory and retrieved for compilation and execution. On power-up, the computer hardware automatically executes physically-embedded machine-level software that drives the compilation and execution of the other computer software components which then assert control. Due to this automated execution, the presence of the higher-level software in memory physically changes the structure of the computer hardware machines into special-purpose network circuitry to serve user communication devices with IP communication services over wireless IAB links.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. Thus, the invention is not limited to the specific embodiments described above, but only by the following claims and their equivalents.

What is claimed is:

1. A method of operating a wireless communication network that serves a plurality of user communication devices using Internet Protocol (IP) and Integrated Access and Backhaul (IAB), the method comprising:
    an IAB Mobile Termination (MT) and an IAB donor establishing an IAB link over wireless and wired communication channels;
    the IAB MT and a Centralized Unit (CU) establishing a plurality of IP links that each have a unique Quality-of-Service (QoS) level over the IAB link;
    the IAB MT establishing a direct communication link over glass fibers or metallic links with a user communication device of the plurality of user communication devices that couples the IAB MT to the user communication device;
    the IAB MT receiving a QoS request from the user communication device that specifies a QoS requirement for a data stream;
    the IAB MT and the CU correlating the QoS requirement of the QoS request with one of the plurality of IP links that comprises the corresponding unique QoS levels;
    the IAB MT exchanging the data stream having the QoS requirement with the user communication device over the glass fibers or metallic links;
    the IAB MT wirelessly exchanging the data stream over the one of the plurality of IP links based on the QoS correlation; and
    the CU exchanging the data stream with a data communication network based on the QoS requirement of the data stream.

2. The method of claim 1 wherein:
- establishing the plurality of IP links comprises establishing a plurality of Backhaul Adaption Protocol (BAP) links that each have the unique QoS level; and
- wirelessly exchanging the data stream over the one of the plurality of IP links comprises exchanging the data stream over one of the plurality of BAP links based on the QoS correlation.

3. The method of claim 1 wherein:
- establishing the plurality of IP links comprises establishing a plurality of Radio Link Control (RLC) links that each have the unique QoS level; and
- wirelessly exchanging the data stream over the one of the plurality of IP links comprises exchanging the data stream over one of the plurality of RLC links based on the QoS correlation.

4. The method of claim 1 wherein:
- establishing the plurality of IP links comprises establishing a plurality of Backhaul Adaption Protocol (BAP) links that each have the unique QoS level and establishing a plurality of Radio Link Control (RLC) links that each have the unique QoS level; and
- wirelessly exchanging the data stream over the one of the plurality of IP links comprises exchanging the data stream over one of the plurality of BAP links based on the QoS correlation and one of the plurality of RLC links based on the QoS correlation.

5. The method of claim 1 wherein:
- establishing the plurality of IP links comprises establishing a plurality of General Purpose Radio Service Transfer Protocol (GTP) tunnels that each have the unique QoS level; and
- wirelessly exchanging the data stream over the one of the plurality of IP links comprises exchanging the data stream over one of the plurality of GTP tunnels based on the QoS correlation.

6. The method of claim 1 wherein wirelessly exchanging the data stream over the IP links comprises selecting Differentiated Services Control Point (DSCP) marks based on the QoS correlation and marking IP packets that transport the data stream with the DSCP marks based on the QoS correlation.

7. The method of claim 1 further comprising:
- a Distributed Unit (DU) interworking the IP links between a plurality of Radio Link Control (RLC) links that each have the unique QoS level and a plurality of Backhaul Adaption Protocol (BAP) links that each have the unique QoS level;
- the DU interworking the IP links between the BAP links and General Purpose Radio Service Transfer Protocol (GTP) tunnels that each have the unique QoS level; and
- the DU interworking network signaling between BAP signaling and F1 signaling.

8. The method of claim 1 wherein exchanging the data stream with the data communication network comprises additionally correlating each of the unique QoS levels of the IP links with other QoS levels of wireless network tunnels and exchanging the data stream over one of the wireless network tunnels based on the additional QoS correlation.

9. The method of claim 1 wherein the IAB MT wirelessly exchanging the data stream with the CU over the one of the plurality of IP links comprises performing a Network Address Translations (NAT) based on the QoS correlation.

10. The method of claim 1 wherein the CU wirelessly exchanging the data stream with the IAB MT over the one of the plurality of IP links comprises performing a Network Address Translation (NAT) based on the QoS correlation.

11. A wireless communication network to serve a plurality of user communication devices using Internet Protocol (IP) and Integrated Access and Backhaul (IAB), the wireless communication network comprising:
- an IAB Mobile Termination (MT) and an IAB donor configured to establish an IAB link over wireless and wired communication channels;
- the IAB MT and a Centralized Unit (CU) configured to establish a plurality of IP links that each have a unique QoS level over the IAB link;
- the IAB MT configured to establish a direct communication link over glass fibers or metallic links with a user communication device of the plurality of user communication devices that couples the IAB MT to the user communication device;
- the IAB MT configured to receive a QoS request from the user communication device that specifies a QoS requirement for a data stream;
- the IAB MT and the CU configured to correlate the QoS requirement of the QoS request with one of the plurality of IP links that comprises the corresponding unique QoS level;
- the IAB MT configured to exchange the data stream having the QoS requirement with the user communication device over the glass fibers or metallic links;
- the IAB MT configured to wirelessly exchange the data stream over the one of the plurality of IP links based on the QoS correlation; and
- the CU configured to exchange the data stream with a data communication network based on the QoS requirement of the data stream.

12. The wireless communication network of claim 11 wherein:
- the IAB MT and the CU are configured to establish a plurality of Backhaul Adaption Protocol (BAP) links that each have the unique QoS level; and
- the IAB MT and the CU are configured to wirelessly exchange the data stream over one of the plurality of BAP links based on the QoS correlation.

13. The wireless communication network of claim 11 wherein:
- the IAB MT and the CU are configured to establish a plurality of Radio Link Control (RLC) links that each have the unique QoS level; and
- the IAB MT and the CU are configured to wirelessly exchange the data stream over one of the plurality of RLC links based on the QoS correlation.

14. The wireless communication network of claim 11 wherein:
- the IAB MT and the CU are configured to establish a plurality of Backhaul Adaption Protocol (BAP) links that each have the unique QoS level and establish a plurality of Radio Link Control (RLC) links that each have the unique QoS level; and
- the IAB MT and the CU are configured to wirelessly exchange the data stream over one of the plurality of BAP links based on the QoS correlation and one of the plurality of RLC links based on the QoS correlation.

15. The wireless communication network of claim 11 wherein:
- the IAB MT and the CU are configured to establish a plurality of General Purpose Radio Service Transfer Protocol (GTP) tunnels that each have the unique QoS level; and
- the IAB MT and the CU are configured to wirelessly exchange the data stream over one of the plurality of GTP tunnels based on the QoS correlation.

16. The wireless communication network of claim 11 wherein the IAB MT and the CU are configured to select Differentiated Services Control Point (DSCP) marks based on the QoS correlation and mark IP packets that transport the data stream with the DSCP marks based on the QoS correlation.

17. The wireless communication network of claim 11 further comprising:
- a Distributed Unit (DU) configured to interwork the IP links between a plurality of Radio Link Control (RLC) links that each have the unique QoS level and a plurality of Backhaul Adaption Protocol (BAP) links that each have the unique QoS level;
- the DU configured to interwork the IP links between the BAP links and a plurality of General Purpose Radio Service Transfer Protocol (GTP) tunnels that each have the unique QoS level; and
- the DU configured to interwork network signaling between BAP signaling and F1 signaling.

18. The wireless communication network of claim 11 wherein the CU is configured to additionally correlate each of the unique QoS levels of the IP links with other QoS levels of wireless network tunnels and exchange the data stream over one of the wireless network tunnels based on the additional QoS correlation.

19. The wireless communication network of claim 11 wherein the IAB MT is configured to perform a Network Address Translation (NAT) based on the QoS correlation to wirelessly exchange the data stream with the CU over the one of the plurality of IP links.

20. The wireless communication network of claim 11 wherein the CU is configured to perform a Network Address Translation (NAT) based on the QoS correlation to wirelessly exchange the data stream with the IAB MT over the one of the plurality of IP links.

* * * * *